US011562196B2

(12) United States Patent
Turki et al.

(10) Patent No.: US 11,562,196 B2
(45) Date of Patent: Jan. 24, 2023

(54) IDENTIFICATION DEVICES

(71) Applicant: Omni-ID Corporation, Inc., East Rochester, NY (US)

(72) Inventors: Badredin Turki, Farnham (GB); Charles Vilner, Crawley (GB); Vijay Kumar, Navi Mumbai (IN); Anthony Victor Kington, Hampshire (GB); David Edward Hewett, Hampshire (GB)

(73) Assignee: Omni-ID Corporation, Inc., East Rochester, NY (US)

( * ) Notice: Subject to any disclaimer, the term of this patent is extended or adjusted under 35 U.S.C. 154(b) by 0 days.

(21) Appl. No.: 17/483,556

(22) Filed: Sep. 23, 2021

(65) Prior Publication Data

US 2022/0277183 A1    Sep. 1, 2022

Related U.S. Application Data

(63) Continuation-in-part of application No. 17/188,244, filed on Mar. 1, 2021, now Pat. No. 11,347,991.

(51) Int. Cl.
*G06K 19/077* (2006.01)

(52) U.S. Cl.
CPC . *G06K 19/07758* (2013.01); *G06K 19/07773* (2013.01)

(58) Field of Classification Search
CPC ............... G06K 19/07758; G06K 19/07773
USPC .......................................................... 235/492
See application file for complete search history.

(56) References Cited

U.S. PATENT DOCUMENTS

| | | | |
|---|---|---|---|
| 2012/0018652 A1* | 1/2012 | Yoder | G01T 1/10 |
| | | | 250/483.1 |
| 2017/0172701 A1* | 6/2017 | Kube | H01Q 1/38 |
| 2019/0303630 A1* | 10/2019 | Raptis | G06K 7/10128 |
| 2019/0387848 A1* | 12/2019 | Leybourn | H04B 5/0031 |
| 2020/0342280 A1* | 10/2020 | Mei | G06K 19/07701 |
| 2020/0380329 A1* | 12/2020 | Lin | H01Q 5/335 |
| 2020/0405239 A1* | 12/2020 | Trabish | H01Q 5/10 |
| 2021/0231471 A1* | 7/2021 | Picot | G01F 1/26 |

* cited by examiner

*Primary Examiner* — Allyson N Trail
(74) *Attorney, Agent, or Firm* — McDonnell Boehnen Hulbert & Berghoff LLP

(57) ABSTRACT

Described examples relate to a radio frequency identification (RFID) device configured to be coupled to a surface of an object. The RFID device may include a housing having a first casing and a second casing. The RFID device may also include an RFID tag disposed between the first casing and the second casing. The RFID tag may comprises an antenna and an integrated circuit coupled to the antenna. Further, the RFID device may include a first break-line defined in the first casing and extending between an inner edge and an outer edge of the first casing. The first casing may be breakable along the first break-line. In addition, the RFID device may include a second break-line defined in the second casing and extending between an inner edge and an outer edge of the second casing. The second casing may be breakable along the second break-line.

20 Claims, 10 Drawing Sheets

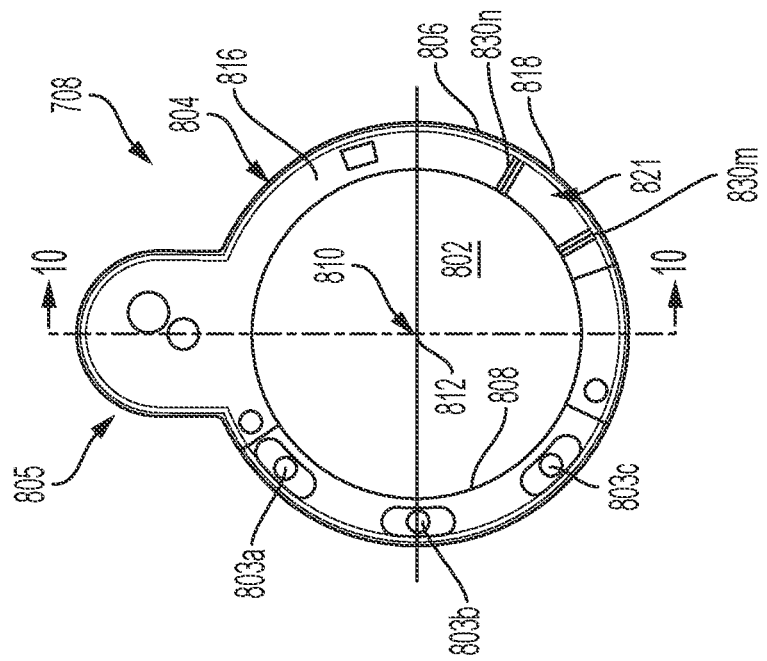
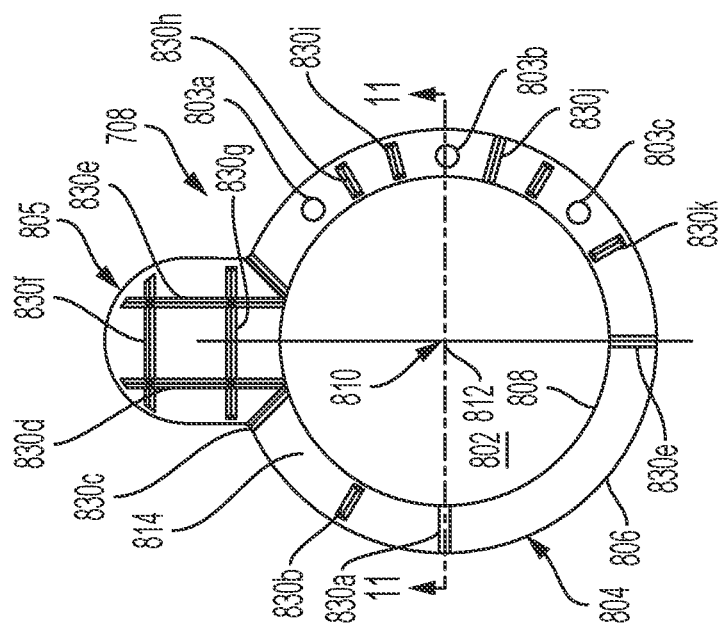
FIG. 9
FIG. 8

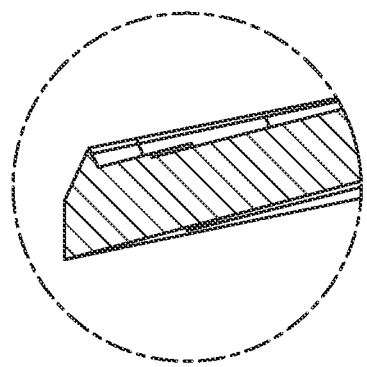
FIG. 13
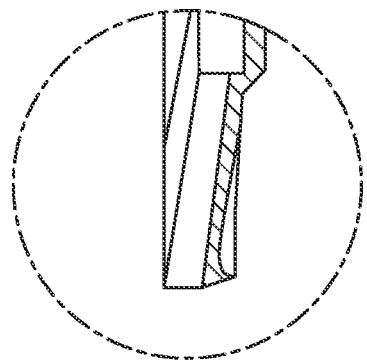
FIG. 12
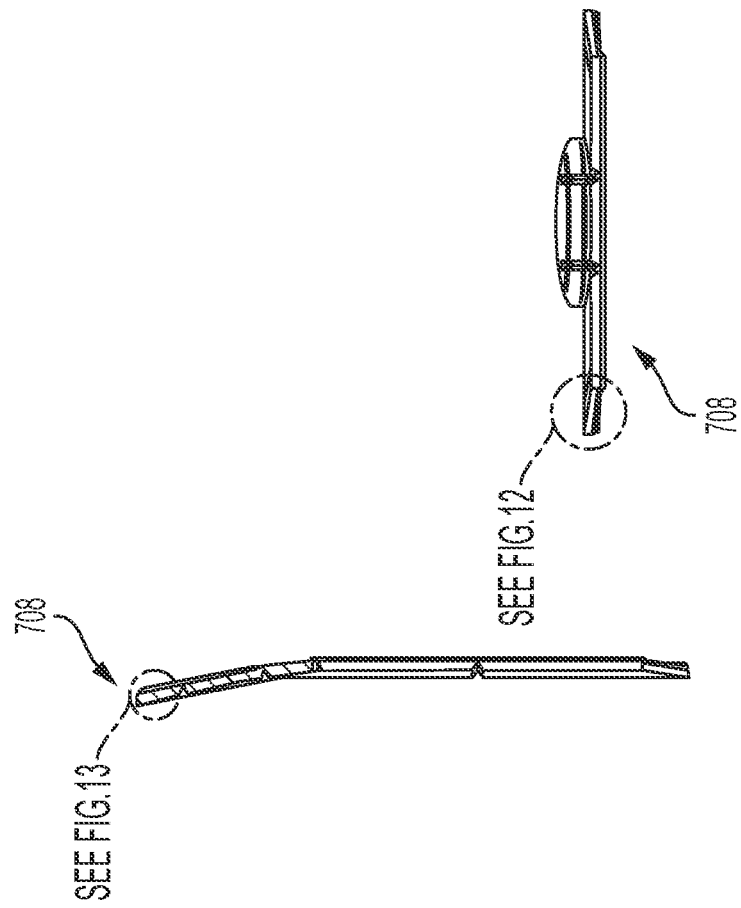
FIG. 11
FIG. 10

IDENTIFICATION DEVICES

CROSS-REFERENCE TO RELATED APPLICATIONS

This application is a continuation-in-part of U.S. patent application Ser. No. 17/188,244 entitled "Identification Devices," filed Mar. 1, 2021, which is hereby incorporated herein by reference.

FIELD OF THE INVENTION

The present application generally relates to identification devices, and more specifically, to Radio-frequency identification (RFID) devices configured to be coupled to an object.

BACKGROUND

Radio Frequency Identification (RFID) systems are widely used for identifying and tracking objects. RFID systems typically include RFID devices and RFID readers (e.g., interrogating devices) for reading and/or writing information to/from the RFID devices. RFID systems are particularly useful in the management of objects being stored, processed, transported, and/or handled. For example, an RFID device may be placed on or attached to an object to be tracked. The RFID device typically includes an antenna and an integrated circuit (IC) that can store information about the tracked object. The RFID device may be passive, in which the RFID device is powered by an electromagnetic field used to read the RFID device, or active in which the RFID device contains a power source.

One application for the use of RFID devices is in industries that employ reusable containers for storing, transporting and dispensing consumable products, such as gas containers holding pressurized gas (e.g., oxygen, propane, acetylene, nitrogen, and the like). Traditionally, identification plates or labels may be affixed to the gas containers or cylinders to display identification information about the container. One disadvantage with this approach is that the gas containers tend to be relatively bulky and are not easily moved making the identification labels often difficult to read. Further, during transportation and use, the gas containers may be subjected to a wide variety of environmental conditions which may degrade the information on the identification labels. In addition, the gas containers are sometimes handled relatively roughly which tends to degrade, chip, or smear the information on the identification labels.

Due to the potential problems with using traditional identification plates for gas containers, it may be desirable to employ RFID devices for identifying and tracking gas containers. For example, RFID devices may be used for ownership identification, asset management, fraud prevention, container safety inspections and/or other purposes. In some applications, RFID devices may be applied as adhesive labels to containers. However, such RFID devices may be tampered with by unauthorized removal of the RFID device from the container. Once removed, the RFID devices may be applied or affixed to another or different container. As such, the removal and re-use of RFID devices for certain types of containers (e.g., containers storing hazardous materials) may cause a security risk that may be undesirable. Further, without a visual inspection of the containers, the identity and/or authenticity of the containers associated with RFID devices may be suspect if the RFID devices can be tampered with.

SUMMARY

The present application describes RFID devices that may be adapted to be attached or affixed to objects to be tracked. The RFID devices may be designed to operate on objects having conductive surfaces, such as metallic surfaces, etc. The RFID devices may be durable and may be resistant to harsh environmental and handling conditions. The RFID devices may also have a low profile and may be permanently secured to the surface of the objects to prevent the RFID devices from being removed from objects and re-used. Further, the RFID devices may be designed to be destroyed in the event of tampering. For example, if an attempt is made to remove the RFID devices from the objects, the RFID devices may readily break into several pieces to prevent re-use.

In one aspect, the present application describes a radio frequency identification (RFID) device configured to be coupled to a surface of an object. The RFID device may include a housing having a first casing and a second casing. The first and second casings each have an inner edge and an outer edge. The RFID device may also include an RFID tag disposed between the first casing and the second casing. The RFID tag may comprise an antenna and an integrated circuit coupled to the antenna. Further, the RFID device may include a first break-line defined in the first casing and extending between the inner edge and the outer edge of the first casing. The first casing may be breakable along the first break-line. In addition, the RFID device may include a second break-line defined in the second casing and extending between the inner edge and the outer edge of the second casing. The second casing may be breakable along the second break-line.

In another aspect, the present application describes a radio frequency identification (RFID) device configured to be coupled to a surface of an object. The RFID device may include a housing comprises a substantially cylindrically shaped portion having an opening extending therethrough. The opening may define a center axis. The RFID device may also include an RFID tag attached to the housing and comprising an antenna and an integrated circuit coupled to the antenna. The RFID tag may include a plurality of break-lines. Each of the plurality of break-lines may be oriented along a radial line passing through the central axis.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE DRAWINGS

FIG. 8 is a top view of a lowercasing of the housing of FIG. 7;

FIG. 9 is a bottom view of the lower casing of the housing of FIG. 7;

FIG. 10 is a cross-sectional view of the lower casing of FIG. 9 taken along line A-A;

FIG. 11 is a cross-sectional view of the lower casing of FIG. 8 taken along line B-B;

FIG. 12 illustrates a portion of the lower casing of FIG. 8;

FIG. 13 illustrates a portion of the lower casing of FIG. 10;

DETAILED DESCRIPTION

Example apparatus are described herein. It should be understood that the words "example," "exemplary," and "illustrative" are used herein to mean "serving as an example, instance, or illustration." Any implementation or feature described herein as being an "example," "exemplary," and/or "illustrative" is not necessarily to be construed as preferred or advantageous over other implementations or features. Thus, other embodiments can be utilized and other changes can be made without departing from the scope of the subject matter presented herein. Accordingly, the example embodiments and implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. Unless otherwise noted, the figures are not drawn to scale. Further, like reference numbers in the figures refer to like elements throughout the figures.

The present application describes identification devices or RFID devices (e.g., transponders) configured to be attached to objects or articles to be tracked. The RFID tags may be passive devices that derive power from signals of the RFID readers or active devices that include internal power sources. The RFID devices may be associated with objects for a variety of purposes including, but not limited to, tracking inventory, tracking status, collecting payments, billing customers, determining location information, temperature monitoring and other sensing applications, etc.

The RFID devices may be designed to operate on objects having conductive surfaces, such as metallic surfaces, etc. The RFID devices may also be flexible to enable the RFID devices to conform to the shape of the tracked objects. Further, the RFID devices may have a low profile and may be permanently secured to the surface of the objects to prevent the RFID devices from being removed from the objects and re-used. The RFID devices may be designed to be destroyed in the event of tampering. For example, if an attempt is made to remove the RFID devices from the objects, the RFID device may readily break into several pieces to prevent re-use. In addition, the RFID devices may be resistant to harsh environmental conditions, careless or improper handling of the tracked objects, and/or contact with fluids, such as water.

Figure 1:
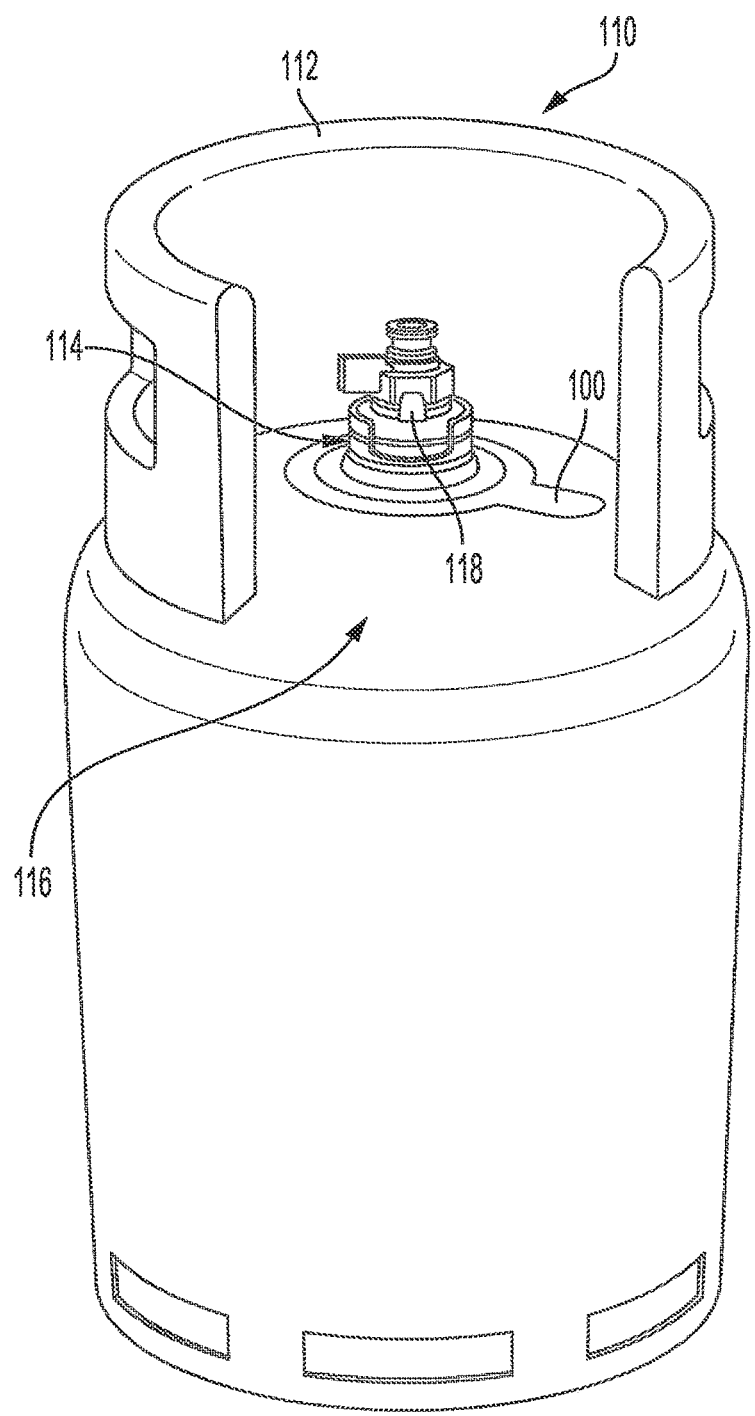
FIG. 1 illustrates a perspective view of a container with a RFID device affixed to an upper surface of the container, according to an example implementation.

Referring now to the figures, FIG. 1 shows a RFID device 100, which could alternatively be a transponder, attached to an upper surface of a container 110, according to an example embodiment. The container 110 may have an elongated, generally cylindrical body and may be made with rigid material, such as steel or metal. The container 110 may contain propane gas, natural gas, oxygen gas, hydrogen gas, or any other gas or material.

The container 110 may have a collar 112 and a valve assembly 114. The collar 112 may be mounted to the upper surface of the container 110 and may be configured to help protect the valve assembly 114 during storage, transportation, and handling. In some embodiments, the collar 112 could provide one or more handles. The collar 112 may be designed to define an open section 116 to allow access to the valve assembly 114. The valve assembly 114 may control the flow of material or gas into and out of the container 110 via a valve stem 118 (e.g., an outlet port). The valve stem 118 of the valve assembly 114 may face toward the open section 116.

As shown in FIG. 1, the RFID device 100 may be adapted to be placed on or attached to the container 110. For example, an adhesive may be used to affix the RFID device 100 to the upper surface of the container 110. In one example embodiment, the RFID device 100 may be fabricated with an adhesive backing that may be used to attach the RFID device 100 to the container 110. The adhesive backing may hold the RFID device 100 in a fixed position and may prevent detachment of the RFID device 100 from the container 110. In some embodiments, the RFID device 100 maybe fitted inside a pre-defined recess defined in the container 110 to provide extra security and safety for the device, as the structure or body of the RFID device 100 will conform to the surface of the container 110.

Further, the RFID device 100 may be designed with a low profile so that the RFID device 100 may not obstruct or hinder various processes that the container 110 may undergo during its life cycle, such as refilling, handling, transporting, storing, connecting and/or disconnecting a regulator or hose, etc. In one example embodiment, the RFID device 100 may be configured to be positioned around the valve assembly 114 of the container 110. For example, the RFID device 100 may be installed on the upper surface of a container 110 encircling the valve assembly 114 as shown in FIG. 1. By attaching the RFID device 100 on the upper surface of the container 110, the RFID device 100 may avoid or reduce contact from external articles during handling and transport, such as impacts with other containers. Further, the RFID device 100 may not be damaged or become detached if the container 110 is knocked over.

The RFID device 100 enables the container 110 to be tracked while the container 110 is stored in inventory and during inspection, handling and use. For example, an RFID reader or interrogator (not shown) can read information stored by the RFID device 100 by transmitting an electromagnetic signal to interrogate the RFID device 100. The RFID device 100 can respond by transmitting information to the RFID reader. The information can include an identifier associated with container, such as a serial number or cylinder ID, and other information, such as container type, weight, contents, and/or product information. The identifier obtained by the RFID reader may then be compared to entries of container identifiers in a database for identification and tracking purposes. The RFID reader may also display the information obtained from the RFID device 100 to a user.

Figure 2:
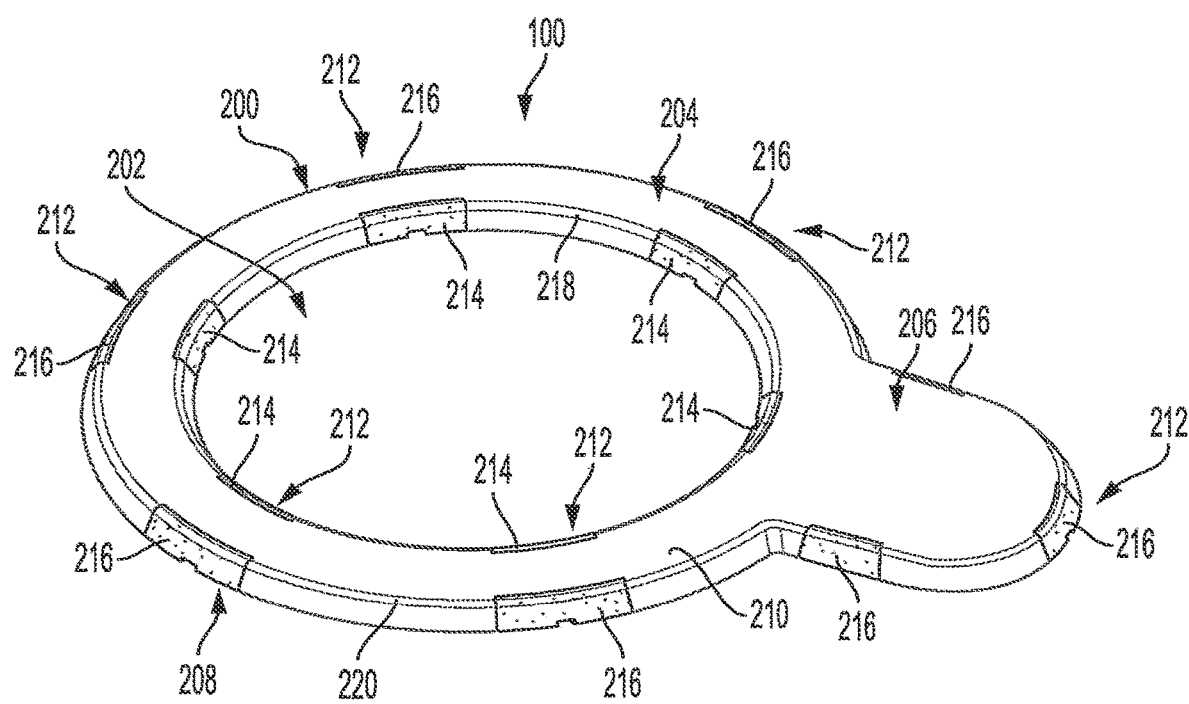
FIG. 2 illustrates a housing of a RFID device, according to an example implementation.

As shown in FIG. 2, the RFID device 100 includes a housing or casing 200, which encloses or encapsulates at least one RFID tag having an antenna and an integrated circuit (not shown) as further described below. The housing 200 provides the at least one RFID tag with protection from potential damage during handling and transportation of the container 110, such as dropping the container and/or other improper handling. For example, the housing 200 may be designed to absorb forces, such as impacts, without shattering or breaking. Further, the housing 200 may be configured to protect the at least one RFID tag from environmental conditions, contaminants, water, and temperature.

The housing 200 may be molded from a plastic or polymeric material and may be manufactured according to known injection molding or ultrasonic welding techniques. In some exemplary embodiments, an adhesive layer can be used to join upper and lower portions or casings of the housing together. Further, the housing 200 may be designed with a low profile so that it will not interfere with the handling of the container 110 and may help prevent the housing 200 from being inadvertently detached from the container 110. The housing 200 may have a thickness of $\lambda_d/10$ or less, $\lambda_d/100$ or less, or $\lambda_d/1000$ or less, where $\lambda_d$ is the wavelength in the dielectric material. In one example embodiment, the housing 200 may have a thickness of about 3.2-3.5 mm.

Further, the housing 200 may be configured to be flexible to enable the housing 200 to be affixed to uneven or curved surfaces. For example, the housing 200 may conform to the upper curved shape of the container 110 as shown in FIG. 1. The housing 200 may also include shape retention attributes or properties for retaining the housing 200 in the shape of the object (e.g., container) that the housing 200 is attached to. The shape retention attributes of the housing 200 may improve the attachment of the housing 200 to the surface of the container 110 and prevent the housing 200 from becoming separated or removed from the container 110.

As shown in FIG. 2, the housing 200 may having a substantially annular or cylindrical shape. For example, the housing 200 may be configured in a substantially circular shape with an opening or aperture 202 extending therethough. In one example embodiment, the housing 200 may comprise a substantially circular ring 204 (e.g., a ring member). The width of the circular ring 204 may be $\lambda_d/8$ or less or $\lambda_d/10$ or less and the thickness of the circular ring 204 may have a thickness of $\lambda_d/10$ or less, $\lambda_d/100$ or less, or $\lambda_d/1000$ or less. In one example embodiment, the width of the circular ring 204 may be about 11.1 mm and the circular ring 204 may have a thickness of about 3.5 mm. Further, the outer diameter of the circular ring 204 may be about 93.1 mm, $\lambda_d$ or less, $\lambda_d/2$ or less, or $\lambda_d/4$ or less and the diameter of the opening 202 of the circular ring 204 may be about 68.3 mm, $\lambda_d/2$ or less, or $\lambda_d/4$ or less.

The housing 200 may include a tab portion or flange 206, which integrally extends outwardly from the circular ring 204. The tab portion 206 of the housing 200 may be slightly curved or bent to conform to the outer surface of the container 110 to further prevent the removal of the housing 200 from the container 110. In one example embodiment, the tab portion 206 of the housing 200 may encase or house at least one RFID tag (not shown) as further described below. The tab portion 206 may have a length of about 27.4 mm and a width of about 33.1 mm. The size of the tab portion 206 may vary to accommodate the size and the shape of different antenna structures. Further, the tab portion 206 may have the same thickness or greater than the circular ring 204 of the housing 200. In one example embodiment, the tab portion 206 may have a thickness of about 1.2 mm.

As shown in FIG. 2, the housing 200 may have a two-piece construction including a base layer (e.g., a PC, ABS or similar core) 208 and a cover layer or top 210. One or more RFID antennas or tags (not shown) may be mounted on or in the base layer 208 and the cover layer 210 may be molded over the RFID tags to encase or encapsulate the RFID tags within the base and cover layers 208 and 210. In other embodiments, the RFID antenna may be mounted on or in the cover layer 210 with the base layer 208 added using an adhesive layer or ultrasonic welding.

The base layer 208 may comprise a polycarbonate material and the cover layer 210 may comprise an acrylonitrile butadiene styrene (ABS) material. In other example embodiments, the base layer 208 and cover layer 210 may be composed of the same material or any other suitable material. The base layer 208 and cover layer 210 may have a thickness of about $\lambda_d/10$ or less, $\lambda_d/100$ or less, or $\lambda_d/1000$ or less. In one embodiment, the base layer 208 may have a thickness of about 2 mm and the cover layer 210 may have a thickness of 1 mm.

The cover layer 210 of the housing 200 may have a plurality of pairs of oppositely opposed tabs or fingers 212 that are spaced apart and extend circumferentially around the housing 200 to secure the cover layer 210 to the base layer 208. As shown in FIG. 2, the cover layer 210 may include seven (7) pairs of oppositely opposed tabs 212. Each pair of the tabs 212 may have an inner tab 214 that engages with an inner edge of the base layer 208 and an outer tab 216 that engages with an outer edge of the base layer 208. As such, the base layer 208 may snap-fit into the cover layer 210 to form the housing 200. In other embodiments, the housing 200 may have a one-piece construction. For example, one or more RFID antennas or tags may be encapsulated in a liquid resin which may be subsequently cured to form the housing 200 of the RFID device 100.

Figure 3:
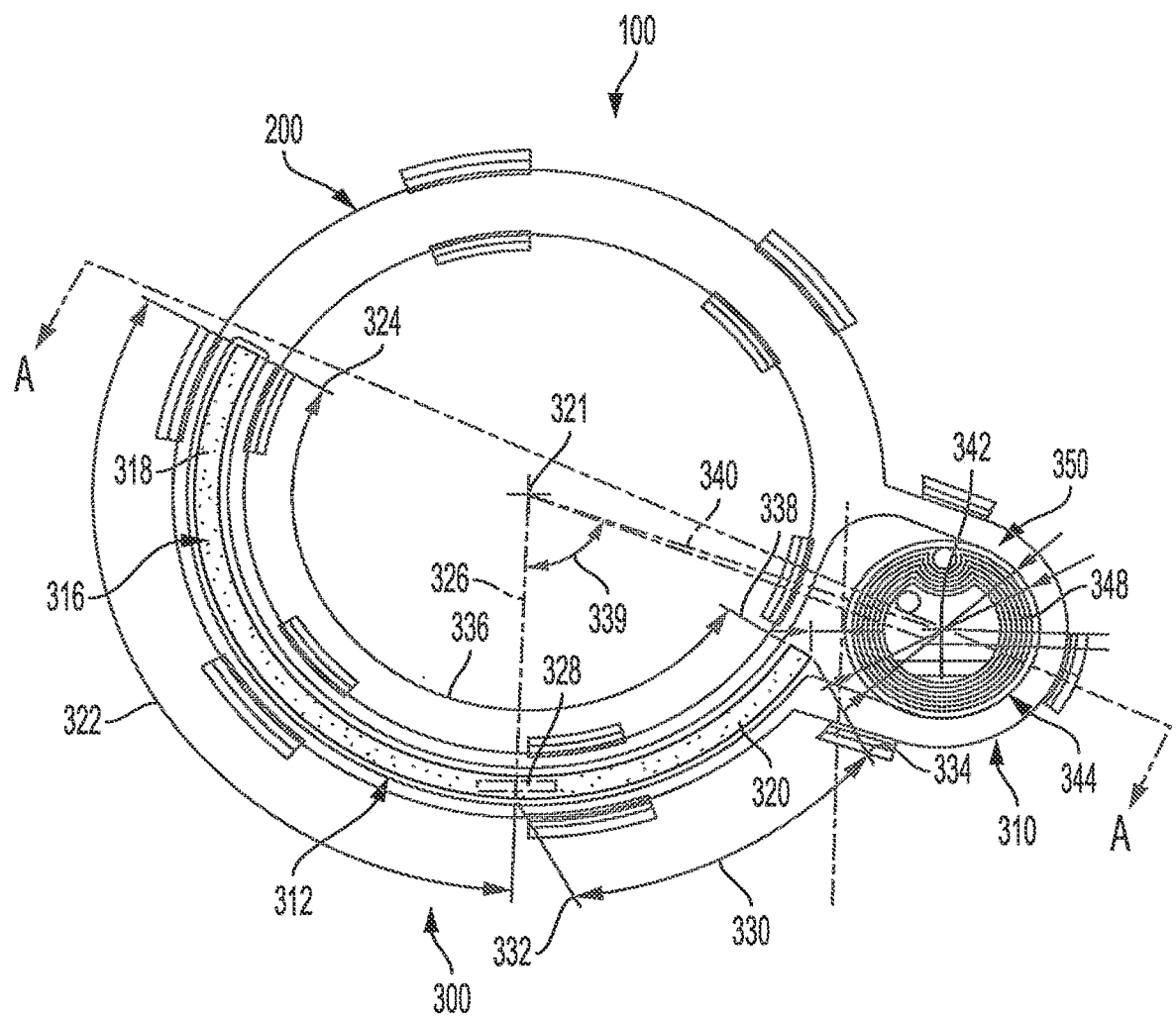
FIG. 3 illustrates a schematic transparent layout view of the RFID device of FIG. 2.

Referring to FIG. 3, the RFID device 100 includes a first RFID tag or inlay 300 and a second RFID tag or inlay 310. The first and second RFID tags 300 and 310 may be configured to store information in nonvolatile memory. The first and second RFID tags 300 and 310 may provide the information to an RFID reader (not shown) for identifying, tracking, and monitoring objects or containers associated with the RFID device 100. The information may include, but is not limited to, a unique serial number or product related information, such as a cylinder ID, a stock number, a batch number, a production date, and the like, and may include information regarding the type of gas, the identity of the customer, environment monitoring, etc.

Figure 4:
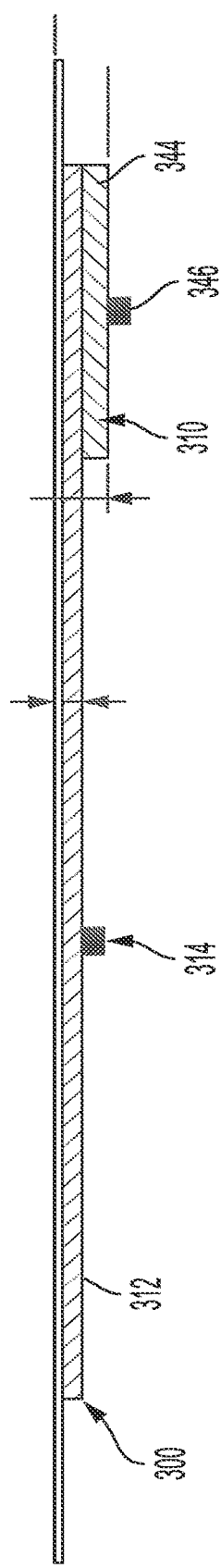
FIG. 4 is a cross-sectional view of the layout of the RFID device of FIG. 3 taken along line A-A.

As shown in FIGS. 3 and 4, the first RFID tag 300 of the RFID device 100 may include a substrate 312 having an integrated circuit 314 (e.g., a microchip) coupled to an antenna assembly 316 for transmitting electronically stored information. The integrated circuit 314 and antenna assembly 316 may be disposed on or embedded in the substrate 312. The substrate 312 may protect the antenna assembly 316 from environmental conditions and improper handling of the tracked object (e.g., the container 110). The substrate 312 may be flexible and may have a generally arcuate or curved shape to conform to the circular configuration of the housing 200. For example, substrate 312 may have an arc shape or C-shape that fits within a portion of the cylindrically shaped housing 200. The substrate 312 may comprise a polyethylene terephthalate (PET) substrate or any other suitable substrate. Further, the substrate 312 may be substantially flat or planar within about +/−10 degrees and may have a thickness of $\lambda_d/100$ or less or $\lambda_d/1000$ or less. In one example embodiment, the substrate 312 is about 0.17 mm.

The first RFID tag 300 may comprise a passive RFID tag that is powered by an electromagnetic field used to read the information stored in the integrated circuit 314 of the first RFID tag 300. In other example embodiments, the first RFID tag 300 may be designed as an active RFID tag by including an internal power source (e.g., a battery) to provide the power to operate the first RFID tag 300.

In one implementation, the first RFID tag 300 may comprise an ultra-high frequency (UHF) tag having an integrated circuit (e.g., microchip) and a UHF antenna assembly having a frequency range of between 860 to 960 MHz. The UHF microchip may comprise a NXP Ucode8 integrated circuit or any other suitable integrated circuit. In other example embodiments, the first RFID tag 300 may be designed to operate at a variety of frequencies, such as low frequencies (LF) at 125-134 kHz, high frequency (HF) at 13.56 MHz, or microwave frequencies at 2.4 and 5.8 GHz.

As shown in FIG. 3, the antenna assembly 316 of the first RFID tag 300 may have a curved structure, such as an arc shape or a C-shape, to fit on or within the curved portion of the substrate 312 and the housing 200. The antenna assembly 316 may include a dipole antenna having a first conductive element 318 and a second conductive element 320. The first conductive element 318 may have a substantial similar radius of curvature as the second conductive element 320 within about +/−10 degrees. Further, the first conductive element 318 may have a different lengths than the second conductive element 320. In other example embodiments, the antenna assembly 316 of the first RFID tag 300 may be a monopole, patch, slot antenna, or a quarter wave antenna.

The direction of the antenna directivity of antenna assembly 316 may be in a substantially upward vertical direction with respect to a ground surface when the RFID device 100 is mounted on the container 110 as shown in FIG. 1. For example, the antenna assembly 316 of the first RFID tag 300 may generate a vertical radiation pattern having a peak gain of a main lobe ±30 degrees near a central axis extending through a center 321 of the housing 200 of the first RFID tag 300. Further, the antenna assembly 316 may generate a horizontal radiation pattern having a peak gain directed in a horizontal direction parallel to the ground surface.

To achieve maximum performance, the antenna assembly 316 of the first RFID tag 300 may be located on the side of the housing 200 that is closest to the open section 116 defined by the collar 112 of the container 110 shown in FIG. 1. Further, the integrated circuit 314 of the first RFID tag 300 may be aligned with the center of the open section 116. In one example embodiment, the minimum radius (r) of the antenna of the antenna assembly 316 may be greater than $\lambda_d/4\pi$, where the effective radius (r) equals the length of value stem plus the distance required to achieve a minimum required read performance when the valve stub 118 is at any orientation in relation to open section 116.

As shown in FIG. 3, an angle 322 formed between a first imaginary straight line 324 and a second imaginary straight line 326 may be about 87 degrees. In some embodiments, the angle 322 may greater or less than 87 degrees depending on the outer diameter of the antenna assembly. The first imaginary straight line 324 extends through the center 321 of the housing 200 and through the outer end of the first conductive element 318 of the antenna assembly 316 and the second imaginary straight line 326 extends through the center 321 of the housing 200 and a center portion 328 of the integrated circuit 314 of the first RFID tag 300. An angle 330 formed between a third imaginary straight line 332 and a fourth imaginary straight line 334 may be about 44 degrees. The third imaginary straight line 332 intersects the second imaginary straight line 326 at an outer point of the housing 200 and the fourth imaginary straight line 334 extends through a corner of the second conductive element 320.

Further, an angle 336 formed between the first imaginary straight line 324 and a fifth imaginary straight line 338 may be about 121 degrees. The fifth imaginary straight line 338 extends through the center 321 of the housing 200 and through the outer end of the second conductive element 320 of the antenna assembly 316. An angle 339 formed between the second imaginary straight line 326 and a sixth imaginary straight line 340 may be about 72 degrees. The sixth imaginary straight line 340 extends through the center 321 of the housing 200 and a center 342 of the antenna assembly 316 of the second RFID tag 310. In other embodiments, the antenna assembly 316 may have different configurations to accommodate various designs of the cylinder.

In operation, fixed and/or handheld RFID readers (e.g., interrogation device) may be positioned above the RFID device 100 to read the first RFID tag 300. For example, the RFID readers may be positioned above the container 110 as shown in FIG. 1. The first RFID tag 300 may be configured to be read from a distance of about 5 meters or more with fixed RFID readers and may be read from a distance of about 3 m meters or more with the handheld RFID reader (e.g., mobile reader). The read range of first RFID device 100 may be increased or decreased depending on the application. For example, the integrated circuit 314 of the first RFID device may be configured to have any suitable read range. The RFID readers may communicate with the first RFID tag 300 by transmitting a modulated radio frequency signal through an interrogation antenna using a carrier frequency corresponding to a resonant frequency of the antenna assembly 316 of the first RFID tag 300. The antenna assembly 316 of the first RFID tag 300 may receive the signal and modulate a backscattered signal back the RFID readers. The signal may include information encoded in the memory of the integrated circuit 314 of the first RFID tag 300. The RFID readers may display the information to a user.

As shown in FIG. 3, the second RFID tag 310 of the RFID device 100 may include a substrate 344 having an integrated circuit 346 (e.g., a microchip) coupled to an antenna assembly or winding 348 for transmitting electronically information stored in the integrated circuit 346. The antenna assembly 348 and intergraded circuit 346 may be disposed on or within the substrate 344. The second RFID tag 310 may be designed to operate on conductive surfaces, such as metallic surfaces. Further, the substrate 344 may protect the antenna assembly 348 and the integrated circuit 346 from environmental conditions and improper handling of tracked objects (e.g., containers).

Further, the substrate 344 may be disposed in the tab portion 206 of the housing 200. As shown in FIG. 4, the substrate 344 of the second RFID tag 310 may be disposed below the substrate 312 of the first RFID tag 300. In some embodiments, the substrate 344 and the substrate 312 may be formed as one substrate. The substrate 344 of the second RFID tag 310 may be planar and have a substantially cylindrical shape. The substrate 344 may comprise a polyethylene terephthalate (PET) substrate or any other suitable substrate. The substrate 344 may be flexible and have a thickness of about 0.17 mm, $\lambda_d/100$ or less, or $\lambda_d/1000$ or less. Further, the substrate 344 may have an outer diameter of about 23 mm. In some embodiments, the outer diameter may be greater or less than 23 mm depending on the size and shape of the second RFID tag 310.

The second RFID tag 310 may comprise a passive RFID tag that is powered by an electromagnetic field used to read stored information. In other example embodiments, the second RFID tag 310 may comprise an active RFID tag having an internal power source (e.g., a battery). In one implementation, the second RFID tag 310 may include a high frequency (HF) tag comprising a HF integrated circuit and a HF antenna assembly. The HF antenna assembly may comprises a plurality of antenna loop windings (e.g., a coil or loop antenna). In one example embodiment, the plurality of antenna loop windings may substantially circular.

The second RFID tag 310 may be configured to communicate using a short-range wireless communication protocol, such as a near-field (NFC) communication standard. For example, the HF tag may include a NFC (HF) microchip and an antenna assembly having a frequency range of about 13.56 MHz. The NFC (HF) microchip may comprise a NXP/Ultralight EV1 (ISO 14443A) integrated circuit or any other HF microchip. In other example embodiments, the RFID tag may be able to communicate using other protocols and standards. In other implementations, the HF antenna assembly may be combined with the UHF antenna assembly of the first RFID tag 300 in a single substrate or inlay.

Figure 6:
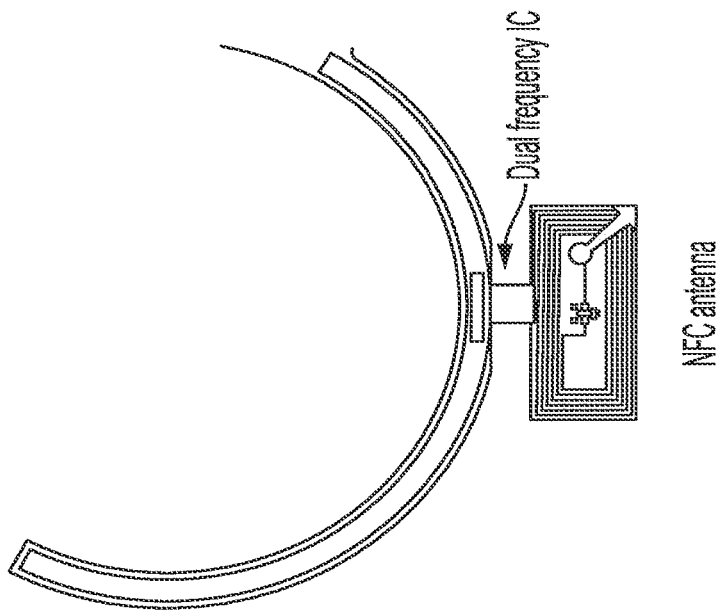
FIG. 6 illustrates a schematic transparent layout view of a RFID device, according to another example.
Figure 5:
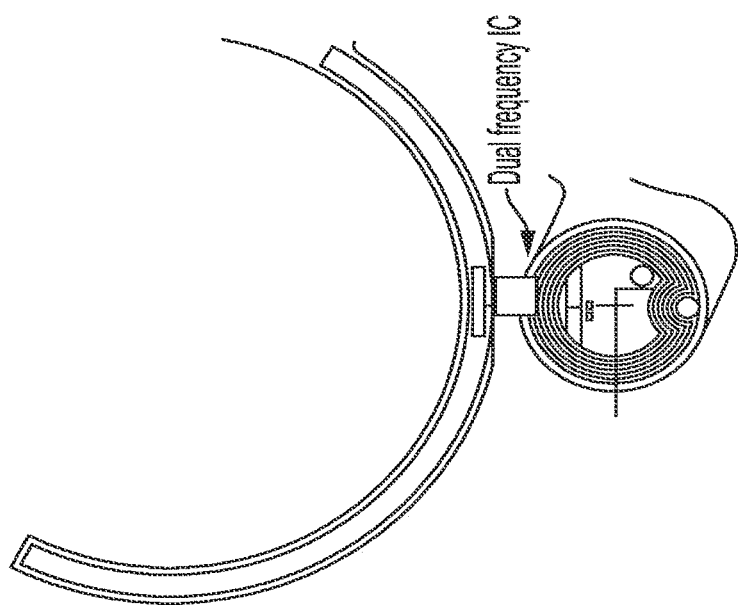
FIG. 5 illustrates a schematic transparent layout view of a RFID device, according to another example.

In some embodiments, the RFID device 100 may have a HF antenna, a UHF antenna, and a dual frequency integrated circuit as shown in FIGS. 5 and 6. The dual frequency integrated circuit may comprise an emlecho-V ("EM4425") integrated circuit or any other suitable dual frequency integrated circuit. The HF antenna may have a substantially circular shape as shown in FIG. 5 or a substantially rectangular shape as shown in FIG. 6.

In operation, a handheld RFID reader (e.g., interrogation device) may be positioned near the second RFID tag 310 of the RFID device 100. For example, the handheld RFID reader may be positioned above RFID device 100 attached to the container 110 shown in FIG. 1. The second RFID tag 310 may be configured to be read from a distance of up to 3 cm. The RFID handheld reader may communicate with the second RFID tag 310 by transmitting a modulated radio frequency signal to the second RFID tag 310. The antenna assembly 348 of the second RFID tag 310 may receive the signal and modulate a signal back causing a change in the reader magnetic field (e.g., inductive coupling). The signal may include information encoded in the memory of the integrated circuit 346 of the second RFID tag 310. The handheld RFID reader may display the information to a user. In one example, the handheld reader may comprise a mobile device.

As shown in FIG. 3, a shielding or absorbing member 350 may be placed between the second RFID tag 310 and the housing 200. The shielding member 350 may provide a separation between the container 110 and the antenna assembly 348 of the second RFID tag 310. As a result, the shielding member 350 may reduce the amount of energy that may reach the container 110 which can detune and deteriorate the radio frequency (RF) coupling between the antenna assembly of the second RFID tag 310 and a RFID reader. The shielding member 350 may be made of a magnetic material. In one example embodiment, the magnetic material may comprise a ferrite sheet or other suitable material. In other example embodiments, the shielding material may comprise plastic or wood. Further, the shielding member 350 may have a substantially cylindrical shape and may have a diameter of 25 mm. In some embodiments, the diameter of the shielding member 350 may be less or greater than 25 mm depending on the size of the second RFID tag 310. Further, the shield member 350 may be substantially planar within about +/−10 degrees and have a thickness of about 0.1 mm. The thickness of shield member 350 may be less than $\lambda_d/1000$. The thickness depends on the properties of the material of the shield member 350 and the separation between the antenna assembly 348 and the metallic surface 116.

Figure 7:
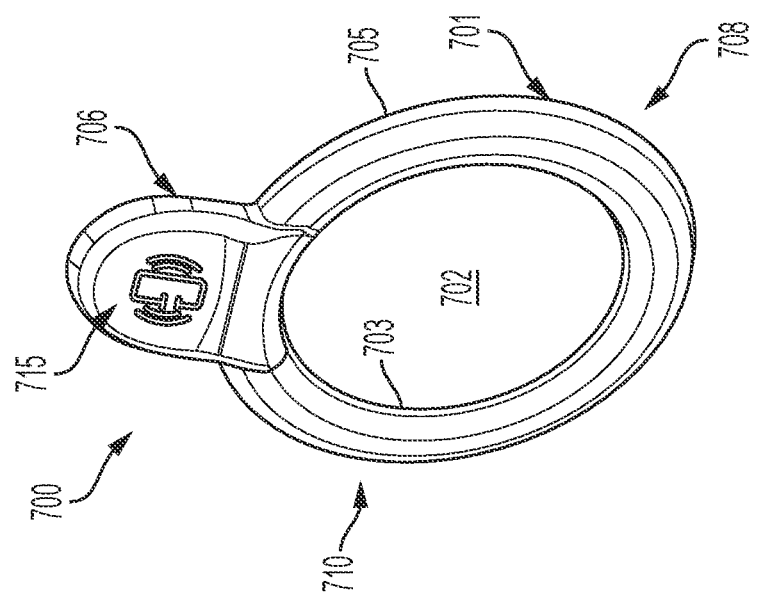
FIG. 7 illustrates another embodiment of a housing of an RFID device, according to an example implementation.

Referring now to FIG. 7, another embodiment of an RFID device is illustrated, which in many respects may correspond in construction and function to the previously described RFID device of FIG. 2. Components of the RFID device which generally correspond to those components of the RFID device and its housing 200 of FIG. 2 may be designated by like reference numerals in the seven-hundred series. As shown in FIG. 7, the RFID device may be designed to be secured or attached to an object or article. For example, the RFID device may be designed to be affixed to the upper surface of the container 110 as shown in FIG. 1. In some exemplary embodiments, the RFID device may be permanently attached to the surface of the object to prevent removal of the RFID device from the object. Further, the RFID device may be designed to break or crack when the RFID device is attempted to be detached from the surface of the object.

The RFID device may be attached to the surface of the object by an adhesive as further described below. The adhesive may create a high strength bond between the RFID device and the surface of the object. The bond between the RFID device and the surface of the object may have a rupture strength greater than that of the structure of the RFID device such that attempts to remove the RFID device from the surface of the object may be unsuccessful without destroying and/or breaking the RFID device.

To increase the difficultly or make it nearly impossible to remove the RFID device as a whole, the RFID device may include one or more break-lines to facilitate the breaking or fracturing of the structure or body of the RFID device. The break-lines may be formed in any pattern in the structure of the RFID device 700 to cause the RFID device 700 to break or crack into pieces when the RFID device 700 is attempted to be removed from the object. The break-lines can include one or more of the following: a recess, a groove, a notch, a cut, a hole or opening, a slit, a perforation, a scored or cut line, a line of weakness, a thinned area or line, a zigzag cut line, a radial wave line, or any combination thereof. In some embodiments, the one or more of the break-lines may comprise a V-shaped cut formed or defined in the RFID device 700. The break-lines may be arranged or positioned in any suitable pattern in the structure of the RFID device. Further, the break-lines may have any suitable orientation or direction. For example, the break-lines may extend in a linear direction or in a substantially straight line. In other embodiments, the break-lines may be configured as radial waves, zig-zag patterns, etc. The break-lines may also be continuous or non-continuous break-lines.

When RFID device is attempted to be removed from the object after the RFID device has been affixed to the object, the RFID device may break or crack into pieces along the break-lines. As a result, the RFID device may be significantly damaged or destroyed. Thus, the RFID device may not be removed and re-used on other containers or products. In other example embodiments, the structure of the RFID device may be designed with different thicknesses. The different thicknesses of the RFID device may cause the device to break more easily at or near the thinner portions of the RFID device when attempts are made to remove the RFID device from the object. As such, the RFID device may be destroyed and may not be able to be re-used.

As shown in FIG. 7, the RFID device includes a housing 700, which encloses or encapsulates one or more RFID tags having an antenna and an integrated circuit as further described below. The housing 700 provides the one or more RFID tags with protection from potential damage. For example, the housing 700 may be designed to absorb forces, such as impacts, to prevent damage to the one or more RFID tags. The housing 700 of the RFID device may also protect the one or more RFID tags from environmental conditions, contaminants, water, and temperature.

The housing 700 of the RFID device may be configured to be flexible to enable the housing 700 to be affixed to uneven or curved surfaces of an object. For example, the housing 700 may conform to the upper curved shape of the container 110 as shown in FIG. 1. The housing 700 may also include shape retention attributes or properties for retaining the housing 700 in the shape of the object (e.g., container) that the housing 700 is attached to. The shape retention attributes of the housing 700 may improve the attachment of the housing 700 to the surface of the object and prevent the housing 700 from becoming separated or removed from the object.

The housing 700 may be molded from a plastic or polymeric material and may be manufactured according to known injection molding or other suitable manufacturing techniques. As shown in FIG. 7, the housing 700 may have a substantially annular or cylindrical shape and may have any suitable width and the thickness. For example, the housing 700 may be configured in a substantially circular ring or shape 701 (e.g., a ring member) with an opening or aperture 702 extending therethrough. The housing 700 may include an inner edge 703 and an outer edge 705. At least a portion of the inner and outer edges 703 and 705 of the housing 700 may be substantially circular. In other embodiments, the inner edge, and outer edges 703 and 705 of the house 700 may have other shapes (e.g., rectangular, polygonal, etc.).

As shown in FIG. 7, the housing 700 may include a tab portion or flange 706, which integrally extends outwardly from the substantially circular ring 701. The tab portion 706 of the housing 700 may be slightly curved or bent to conform to the outer surface of the object to further prevent the removal of the housing 700 from the object. In one example embodiment, the tab portion 706 of the housing 700 may encase or house at least one RFID tag as further described below. The tab portion 706 may have any suitable length and width. For example, the size of the tab portion 706 may vary to accommodate the size and the shape of different antenna structures. Further, the tab portion 706 may have the same thickness or a greater thickness than the circular ring of the housing 700.

Further, the housing 700 may include one or more break-lines to facilitate the breaking or fracturing of the housing as further described below. The break-lines may be formed or configured in any pattern in the housing 700 to cause the housing 700 to break or crack into pieces when the housing 700 is attempted to be removed from the object. In addition, the housing 700 may be designed with a low profile and rounded edges make the housing 700 more difficult to pry-off from the surface of the object.

In some embodiments, the housing 700 may have a two-piece construction including a lower casing or base layer (e.g., a PC, ABS or similar core) 708 and an upper casing or a cover lay 710 as further described below. The lower casing 708 may snap-fit into the upper casing 710 to form the housing 700. The lower casing 708 may be secured to the upper casing 710 with an adhesive as further described below. The lower casing 708 may comprise a polycarbonate material and the upper casing 710 may comprise an acrylonitrile butadiene styrene (ABS) material. In other example embodiments, the lower casing 708 and upper casing 710 may be composed of the same material or different materials. The lower casing 708 and upper casing 710 may have any suitable thickness.

One or more RFID antennas or tags 715 may be mounted on or in the lower casing 708 and the upper casing 710 may be molded over the RFID tags to encase or encapsulate the RFID tags 715 within the lower and upper casings 708 and 710. For example, the RFID antennas or tags 715 may be encapsulated in a liquid resin which may be subsequently cured to form the housing 700 of the RFID device. The RFID tags 715 may include an integrated circuit (e.g., a microchip) coupled to an antenna assembly for transmitting electronically stored information. The integrated circuit and antenna assembly may be disposed on or embedded in the housing 700. For example, the antenna may be mounted on or in the upper casing 710 with the lower casing 708 added using an adhesive layer. In other embodiments, the housing 200 may have a one-piece construction.

Referring now to FIGS. 8-13, an exemplary embodiment of the lower casing or base layer 708 of the housing 700 is illustrated. The lower casing 708 of the housing 700 is designed to be secured to a surface of an object and break when the housing 700 is attempted to be removed from the surface of the object. The lower casing 708 may have a substantially annular or cylindrical shape and may have any suitable width and the thickness. As shown in FIGS. 8 and 9, the lower casing 708 may be configured in a substantially circular shape with an opening or aperture 802 extending therethrough. In one example embodiment, the lower casing 708 may comprise a substantially circular ring 804 (e.g., a ring member). The lower casing may also include a tab portion or flange 805, which integrally extends outwardly from the substantially circular ring 804.

The lower casing 708 may include an outer edge 806 and an inner edge 808 defining the opening 802. As shown, the inner edge 808 of the lower casing 708 is arranged substantially concentric about a central axis 810 extending through the center 812 of the opening 802 and the outer edge 806 of the lower casing 708 is concentric with and spaced radially from the inner edge 808. In other embodiments, the inner edge 808 and the outer edge 806 may be configured in different shapes (e.g., rectangular or polygonal). Further, as shown in FIGS. 8 and 9, the lower casing 708 may include one or more openings or aperture 803a-803c extending therethrough between the outer and inner edges 806 and 808 of the lower casing 708.

The lower casing 708 of the housing 700 may include a top surface 814 and a bottom surface 816. FIG. 8 shows a top view of the lower casing 708 and FIG. 9 shows a bottom view of the lower casing 708. The cross-sectional structure of the lower casing 710 may be as shown in FIGS. 10 and 11. The bottom surface 816 of the lower casing 708 may be configured to be attached or secured to a surface of an object or article. In some embodiments, the bottom surface 816 of the lower casing 708 may be permanently attached to the surface of an object to prevent the lower casing 708 from being removed from the surface of the object.

The bottom surface 816 of the lower casing 708 may be attached to the surface of the object by an adhesive. In some embodiments, the bottom surface 816 of the lower casing 708 includes a cavity or recess 821 defined by an outer wall or skirt 818 along the outer edge 806 of the bottom surface 816 of the lower casing 708. The adhesive may be applied to the cavity 821 to provide a uniform adhesive layer for attaching the lower casing 708 to a surface of an object. The adhesive may comprise any suitable adhesive, such as a liquid adhesive. In some examples, the adhesive may comprise Henkel Loctite 4080 adhesive. The adhesive may create a high strength bond between the bottom surface 816 of the lower casing 708 and the surface of the object. The bond between the lower casing 708 and the surface of the object may have a rupture strength greater than that of the structure of the lower casing 708 such that any attempt to remove the lower casing 708 from the surface of the object destroys and/or breaks the lower casing 708.

Further, the lower casing 708 of the housing 700 may be designed or configured to break or fracture when the lower casing 708 is attempted to be removed or detached from the surface of the object. As shown in FIGS. 8 and 9, the lower casing 708 may include one or more break-lines 830a-830n to provide a pre-weakened breaking or separating path to facilitate the separation between different portions of the lower casing 708 along the break-lines. As such, the break-lines 830a-830n may cause the lower casing 708 to fracture or break alone the break-lines 830a-830n when removal from the object is attempted. The break-lines 830a-830n may be formed in the top surface 814 or the bottom surface 816 of the lower casing 708. In other example embodiments, the break-lines may be formed between the top and bottom surfaces 814 and 816 of the lower casing 708.

The lower casing 708 may include any suitable number of break-lines. The break-lines 830a-830n may be formed in any pattern in the lower casing 708 and may extend through a portion of the thickness of the lower casing 708 (e.g., in the depth direction). As shown in FIGS. 8 and 9, one or more of the break-lines may extend entirely across the width of the lower casing 708 (e.g., between the outer edge 806 and inner edge 808). Further, the break-lines may be positioned at circumferential locations about the center point of the lower casing 708. For example, one or more of the break-lines may be oriented in a radial direction between the inner edge 808 and the outer edge 806 along an imaginary straight line that intersects a central axis 810 of the opening 802 of the lower casing 708. Further, one or more of the break-lines may be defined in the tag portion or flange 805 of the lower casing 708 of the housing 700.

The break-lines 830a-830n may have any suitable pattern. For example, the break-lines 830a-830n may extend in a linear direction or in a substantially straight line. In other embodiments, the break-lines may define radial waves, zig-zag patterns, etc. The break-lines 830a-830n may include one or more of the following: a recess, a groove, a notch, a cut, a hole or opening, a slit, a perforation, a scored or cut line, a line of weakness, a thinned area or line, a zigzag cut line, a radial wave line, or any combination thereof. In some examples, the break-lines 830a-830n may comprises a V-shaped cut as shown in FIGS. 10-12. The break-lines 830a-830n may be continuous break-lines. In other embodiments, the break-lines 830a-830n may not be continuous, and may consist, for example, of multiple or a series of slots, holes, perforations, etc. in a linear or non-linear direction.

Further, the break-lines 830a-830n may define a reduced thickness of a portion of the lower casing 708 or a recess or groove defined in the lower casing 708. As a result, when one tries to remove an RFID device that has been secured to an object, the lower casing 708 of the RFID device may break into several pieces. Therefore, it may be extremely difficult or nearly impossible to remove the RFID device for reuse.

In some example embodiments, various portions of the lower casing 708 of the RFID device may have different adhesion forces by which they adhere to the surface of the object. For example, portions of the lower casing 708 that are attached to the object with weaker adhesion forces may break-off from the surface of the object before other portions of the lower casing 708 attached with stronger adhesive forces, thus destroying or breaking the lower casing 708.

Referring now to FIGS. 14-18, an exemplary embodiment of an upper casing or cover layer 710 of the housing 700 is illustrated. The upper casing 710 may be configured to be attached or secured to the lower casing 708. In some embodiments, the upper casing 710 may be permanently attached to the lower casing 708 to prevent the upper casing 710 from being removed from the lower casing 708 and/or an object. The upper casing 710 may be attached to the lower casing 708 by an adhesive. The adhesive may comprise any suitable adhesive, such as a liquid adhesive. In some examples, the adhesive may comprise Henkel Loctite 4080 adhesive.

Figure 15:
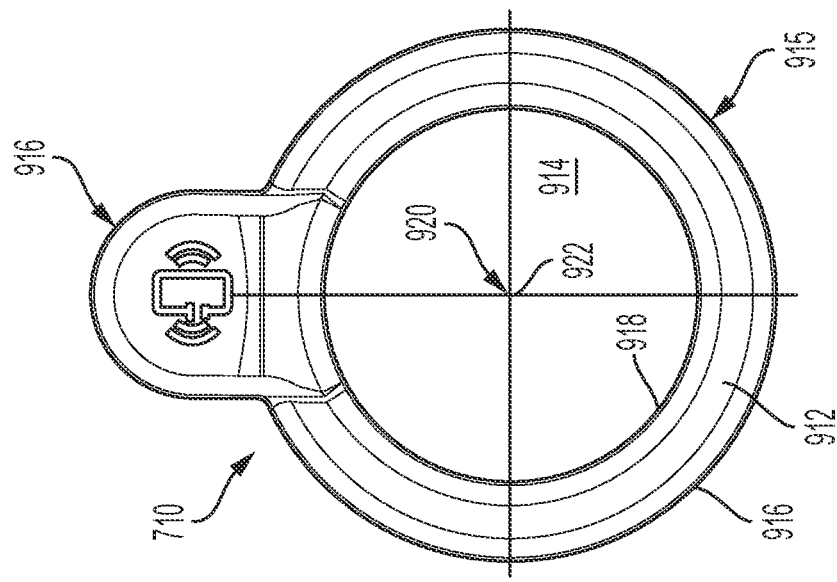
FIG. 15 is a bottom view of the upper casing of the housing of FIG. 7.
Figure 14:
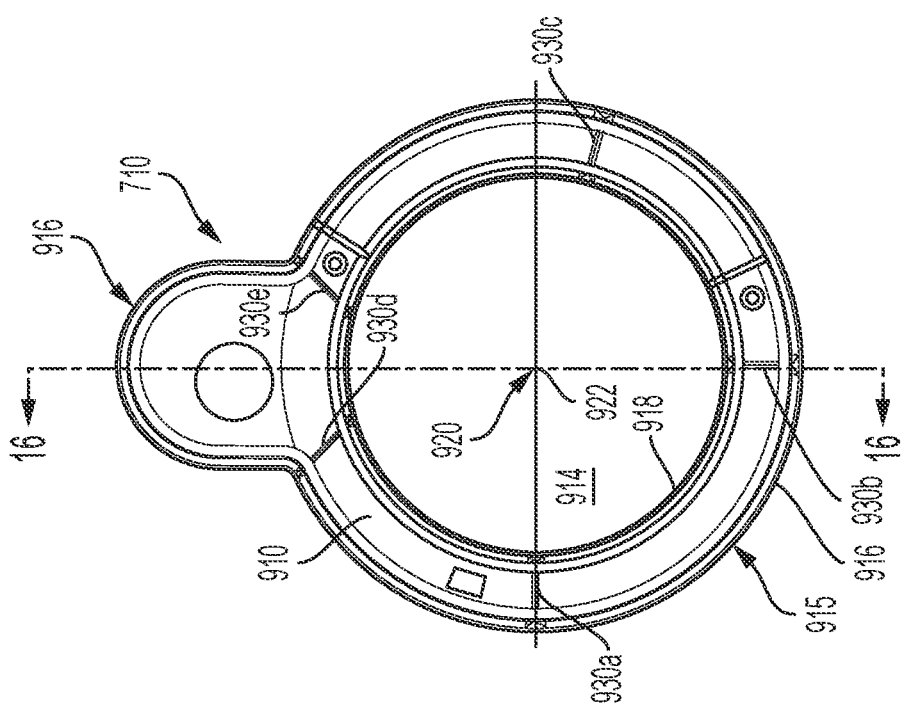
FIG. 14 is a top view of an upper casing of the housing of FIG. 7.
Figure 18:
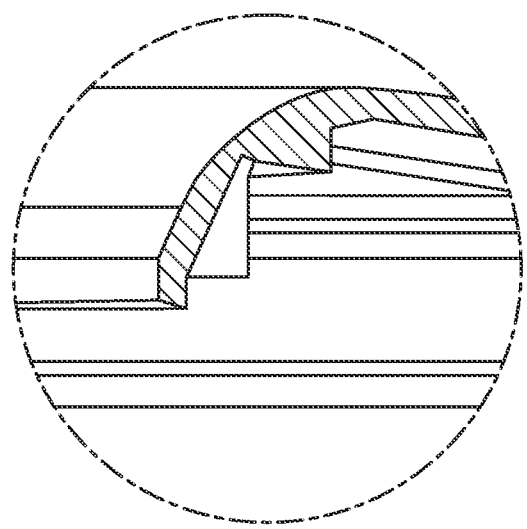
FIG. 18 illustrates a portion of the upper casing of FIG. 16.
Figure 17:
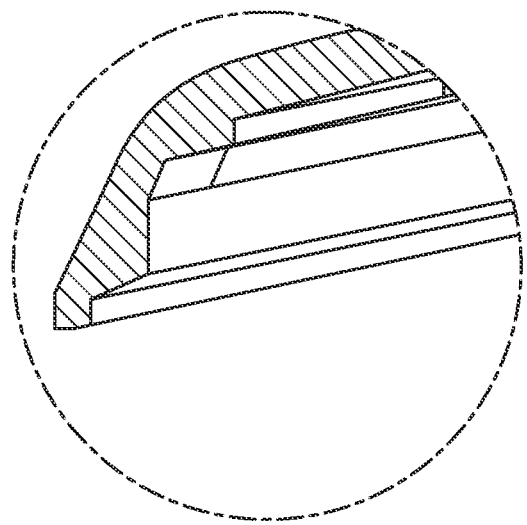
FIG. 17 illustrates a portion of the upper casing of FIG. 16.
Figure 16:
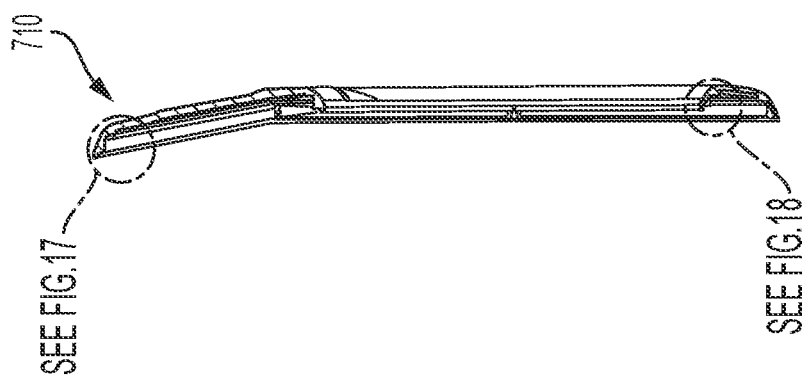
FIG. 16 is a cross-sectional view of the upper casing of FIG. 14 taken along line A-A.

The upper casing 710 may include atop surface or face 910 and a bottom surface 912. FIG. 14 shows a top view of the upper casing 710 of the RFID device and FIG. 15 shows a bottom view of the upper casing 710. The cross-sectional structure of the upper casing 710 may be as shown in FIG. 16. The upper casing 710 may have a substantially annular or cylindrical shape and may have any suitable width and the thickness. As shown in FIGS. 14 and 15, the upper casing 710 of may be configured in a substantially circular shape with an opening or aperture 914 extending therethrough. In one example embodiment, the upper casing 710 may comprise a substantially circular ring 915 (e.g., a ring member). The upper casing 710 may also include a tab portion or flange 916, which integrally extends outwardly from the substantially circular ring 915.

Further, the upper casing 710 may include an outer edge 916 and an inner edge 918 that defines the opening 914. As shown, the inner edge 918 of the upper casing 710 is arranged substantially concentric about a central axis 920 extending through the center 922 of the opening 914 and the outer edge 916 of the upper casing 710 is concentric with and spaced radially from the inner edge 918. In other embodiments, the outer and inner edges 916 and 918 of the upper casing 710 may be configured in different shapes (e.g., rectangular or polygonal).

The upper casing 710 of the housing 700 may be designed to break when the RFID device is attempted to be removed from the surface of the object. In order to make it difficult to remove the RFID device as a whole, the upper casing 710 may include one or more break-lines 930a-930e to provide a pre-weakened breaking or separating path to facilitate the separation between different portions of the upper casing 710 along the break-lines. As such, the break-lines 830a-830n may cause the upper casing 710 to fracture or break along the break-lines 930a-930e when removal from the object is attempted. Thus, the break-lines 930a-930e facilitate the breaking or destruction of the RFID device. The break-lines 930a-930e may be formed in the top surface 910 or the bottom surface 912 of the upper casing 710 or between the top and bottom surfaces 910 and 912 of the upper casing 710.

The break-lines 930a-930e may be formed in any pattern in the upper casing 710 and may extend through a portion of the thickness of the upper casing 710 (e.g., in the depth direction). The break-lines 930a-930e may extend entirely across the width of the upper casing 710 (e.g., between the outer edge and inner edge). In some embodiments, the break-lines 930a-930e may extend from near the outer edge 916 to substantially near the inner edge 918. As shown in FIGS. 14 and 15, one or more of the break-lines may positioned or arranged at circumferential locations about the center 922 of the upper casing 710. For example, one or more of the break-lines may be oriented in a radial direction between the inner edge 918 and the outer edge 916 along an imaginary straight line that intersects the central axis 920 of the opening 914 of the upper casing 710. The upper casing 710 may have any number of break-lines and the break-lines may be oriented in any suitable direction. For example, the break-lines may extend in a linear direction or in a substantially straight line. In other embodiments, the break-lines may be arranged in any suitable pattern, such as radial waves or zig-zag patterns.

Further, the break-lines may be continuous in the upper casing 710. In other embodiments, the break-lines 930a-930e may not be continuous, and may consist, for example, of multiple slots, holes, etc. in a linear or non-linear direction. The break-lines 930a-930e can include one or more of the following, a recess, a groove, a notch, a cut, a hole or opening, a slit, a perforation, a scored or cut line, a line of weakness, a thinned area or line, a zigzag cut line, a radial wave line, or any combination thereof. Further, the break-lines 930a-930e may reduce the thickness or height of a portion of the upper casing 710. In some examples, the break-lines 930a-930e may comprises a V-shaped cut.

Because of the adhesive used to secure the housing 700 of the RFID device to the surface of an object, the housing 700 may be difficult to pry off or be removed from an object. Further, the break-lines defined in the housing 700 may cause the housing 700 to break apart if someone tries to remove it from the object, thereby destroying the RFID device. As a result, the RFID device may not be re-used on other containers or products.

The above detailed description describes various features and operations of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A radio frequency identification (RFID) device configured to be coupled to a surface of an object, the RFID device comprising:
    a housing having a first casing and a second casing, the first and second casings each having an inner edge and an outer edge;
    an RFID tag disposed between the first casing and the second casing, the RFID tag comprising an antenna and an integrated circuit coupled to the antenna;
    a first break-line defined in the first casing and extending between the inner edge and the outer edge of the first casing, the first casing being breakable along the first break-line; and
    a second break-line defined in the second casing and extending between the inner edge and the outer edge of the second casing, the second casing being breakable along the second break-line.

2. The RFID device of claim 1, wherein the housing comprises a substantially cylindrically shaped portion having an opening extending therethrough, and wherein the opening defines a center axis.

3. The RFID device of claim 2, wherein the housing further comprises a flange portion, and wherein the flange portion includes the antenna.

4. The RFID device of claim 1, wherein the first casing of the housing includes a first side and a second side, and wherein the first side is adapted to be secured to the surface of the object by an adhesive.

5. The RFID device of claim 4, wherein the adhesive comprises Henkel Loctite4080 adhesive.

6. The RFID device of claim 4, wherein the first side of the lower casing includes a cavity configured to receive the adhesive to enable to the RFID device to be affixed to the surface of the object.

7. The RFID device of claim 4, wherein the adhesive has a greater adhesion strength than the strength of the first and second break-lines in the housing.

8. The RFID device of claim 1, wherein the first break-line is adapted to facilitate the breaking of adjoining or adjacent portions of the first casing along the first break-line in response to one or more forces, and wherein the second break-line is adapted to facilitate the breaking of the second casing of adjoining or adjacent portions of the second casing along the second break-line in response to the one or more forces.

9. The RFID device of claim 1, wherein the first break-line is defined in the top or bottom surface of the first casing or between the top and bottom of the first casing.

10. The RFID device of claim 1, wherein the second break-line is defined in the top or bottom surface of the second casing or between the top and bottom of the second casing.

11. The RFID device of claim 1, wherein the first break-line comprises one or more of the following: a recess, a groove, a notch, a cut, a hole or opening, a slit, a perforation, a scored or cut line, a line of weakness, a thinned area or line, a zigzag cut line, a radial wave line, or any combination thereof.

12. The RFID device of claim 1, wherein the second break-line comprises one or more of the following: a recess, a groove, a notch, a cut, a hole or opening, a slit, a perforation, a scored or cut line, a line of weakness, a thinned area or line, a zigzag cut line, a radial wave line, or any combination thereof.

13. The RFID device of claim 1, wherein the first break-line comprises a V-shaped cut.

14. The RFID device of claim 1, wherein the second break-line comprises a V-shaped cut.

15. The RFID device of claim 1, wherein the first break-line extends from the inner edge of the first casing to the outer edge of the first casing, and wherein the second break-line extends from the inner edge of the second casing to the outer edge of the second casing.

16. The RFID device of claim 1, wherein the first casing comprises a substantially cylindrically shaped portion having an opening extending therethrough, wherein the opening defines a center axis, and wherein the first break-line is oriented along a radial line passing through the center axis.

17. The RFID device of claim 1, wherein the second casing comprises a substantially cylindrically shaped portion having an opening extending there-through, wherein the opening defines a center axis, and wherein the second break-line is oriented along a radial line passing through the center axis.

18. The RFID device of claim 1, wherein the first break-line is aligned in a plane with the second break-line.

19. A radio frequency identification (RFID) device configured to be coupled to a surface of an object, the RFID device comprising:
- a housing comprises a substantially cylindrically shaped portion having an opening extending therethrough, wherein the opening defines a center axis;
- an RFID tag attached to the housing, the RFID tag comprising an antenna and an integrated circuit coupled to the antenna; and
- a plurality of break-lines, wherein each of the plurality of break-lines is oriented along a radial line passing through the center axis.

20. The RFID device of claim 19, wherein each of the plurality of break-lines comprise a V-shaped cut.

* * * * *